United States Patent
Haddad et al.

(10) Patent No.: US 8,046,260 B2
(45) Date of Patent: Oct. 25, 2011

(54) METHOD AND SYSTEM FOR AUTHORISING RETURNS

(75) Inventors: Aneace Haddad, Les Arcs (FR); Frederic Mayance, Mimet (FR)

(73) Assignee: Welcome Real-Time Pte Ltd, Singapore (SG)

( * ) Notice: Subject to any disclaimer, the term of this patent is extended or adjusted under 35 U.S.C. 154(b) by 175 days.

(21) Appl. No.: 11/665,325

(22) PCT Filed: Nov. 13, 2006

(86) PCT No.: PCT/US2006/043962
§ 371 (c)(1),
(2), (4) Date: Jul. 11, 2008

(87) PCT Pub. No.: WO2007/078431
PCT Pub. Date: Jul. 12, 2007

(65) Prior Publication Data
US 2009/0048934 A1    Feb. 19, 2009

(51) Int. Cl.
*G06Q 20/00* (2006.01)
(52) U.S. Cl. .............. 705/17; 705/14; 705/16; 705/30; 705/35; 705/44; 235/375; 235/381
(58) Field of Classification Search .............. 705/17, 705/30, 35, 44
See application file for complete search history.

(56) References Cited

U.S. PATENT DOCUMENTS

| | | | | |
|---|---|---|---|---|
| 6,129,274 | A  * | 10/2000 | Suzuki | 235/381 |
| 6,213,390 | B1 * | 4/2001  | Oneda | 235/379 |
| 2002/0111918 | A1 * | 8/2002 | Hoshino et al. | 705/65 |
| 2003/0204409 | A1 | 10/2003 | Gorski et al. | |
| 2004/0172260 | A1 * | 9/2004 | Junger et al. | 705/1 |
| 2004/0215531 | A1 | 10/2004 | Stashluk, Jr. et al. | |
| 2005/0192816 | A1 | 9/2005 | Wechsel | |
| 2007/0008102 | A1 * | 1/2007 | Fallin et al. | 340/506 |
| 2009/0228336 | A1 * | 9/2009 | Giordano et al. | 705/10 |

OTHER PUBLICATIONS

International Search Report, PCT/US06/43962 mail date Jul. 17, 2008.

* cited by examiner

*Primary Examiner* — Vanel Frenel
(74) *Attorney, Agent, or Firm* — Banner & Witcoff, Ltd.

(57) ABSTRACT

A method for authorizing return of a purchase by a customer to a merchant by an interaction of a customer chip card upon which a customer transaction history is stored and a merchant POS terminal upon which predetermined data is stored, the method comprising the steps of, (a) reading at least part of the customer transaction history from the customer chip card, (b) comparing the part of the customer transaction history read from the customer chip card with the predetermined data, and (c) issuing to the merchant a message from the POS terminal based upon the outcome of the comparison.

16 Claims, 5 Drawing Sheets

METHOD AND SYSTEM FOR AUTHORISING RETURNS

FIELD OF THE INVENTION

The invention relates to a method and system for authorising returns. In particular it relates to a method and system based on chip card technology for authorising valid and non-abusive returns without dependence upon a central authorisation service. More particularly, the invention relates to the interface between a customer's chip credit or debit card and the merchant's point of sale (POS) terminal.

BACKGROUND OF THE INVENTION

In this specification where a document, act or item of knowledge is referred to or discussed, this reference or discussion is not an admission that the document, act or item of knowledge or any combination thereof was at the priority date publicly available, known to the public, part of the common general knowledge, or known to be relevant to an attempt to solve any problem with which this specification is concerned.

While the current invention will be described with reference to day to day commercial transactions in the retail sector, such as purchase of goods by a customer in a department store, it should be understood that the invention is not so limited but applies to any transaction involving the use of a chip card which requires user authorisation. Furthermore while the invention will be described with reference to a 'customer' this term is not limited to members of the public unrelated to the merchant but includes anyone involved in dealing with the merchant including employees, suppliers and associates of the merchant.

Types of Return Fraud

One of the major sources of loss for merchants around the world is fraudulent and abusive returns. Refund fraud is a system that allows a customer to refund merchandise and profit from the return. In the US alone, approximately 9% of returns are considered fraudulent, costing merchants $16 billion annually.

The most common method of refund fraud involves stealing merchandise from a store then returning it using fictitious customer information. Thieves also "shoplift" at stores by obtaining a discarded receipt, then shoplifting the items listed on the receipt and returning the shoplifted items for a refund. The fraudulent party can thus receive cash for a purchase that was never made. Some stores require the customer returning the item to fill out information including name, address, and telephone number. However this does not necessarily prevent fraud as anyone can give false information and receive a cash refund.

Second, it is known for customers to appropriate receipts from previous sales by other parties and use them to process refunds at a later date. These transactions are typically in the form of cash, but can also be completed using credit cards. In some businesses, depending on the procedures followed, customers may be able to process a fraudulent refund even without a receipt.

Third, customers can buy merchandise at sale prices and then return the merchandise after the sales have finished and receive a full price refund. In most instances the receipt is not required for this technique to be accomplished. The customer can bring an identical item to the register and use that particular item for the refund process. Like most refund frauds, cash is the most commonly preferred form of refund because it does not leave a paper trail.

Fourth, over half of returns fraud is estimated to be due to customers "renting merchandise for free" by legitimately purchasing a product, for example an expensive camcorder, using it once to record a wedding or graduation, then returning the merchandise for a full refund a few days later. A full refund is given and the merchandise has lost quality, value, and a potential true sale.

Fifth, the method of stealing a product or merchandise at one store and returning it to a different store is a widespread problem among chain stores. A customer steals items from one store and has access to receipts or shopping bags with the store's logo, which are used to make the transaction appear legitimate. The customer returning the stolen merchandise merely states they have lost the receipt but because the original price tags are intact the retailer will pay a refund.

Refund Fraud and Chip Cards

Bank cards are often at the centre of returns fraud schemes. Presentation of a credit or debit card by a customer returning goods tends to lend an appearance of legitimacy to the transaction. Thieves have been known to purchase items using stolen credit or debit cards, and then return the items for a refund on another bank card. In other cases, thieves have broken into shops and used the merchant's payment terminal to refund hundreds of transactions using stolen debit cards, which were then immediately used to withdraw cash at ATM machines.

In response to growing bank card fraud, card providers are investing heavily in upgrading their payments infrastructure to cope with chip card technology. Chip technology helps eliminate bank card fraud while at the same time reducing the cost of authorization by allowing a certain number of transactions, or a cumulative transaction value, to be performed off-line without the need for a costly authorization request at every transaction. Chip card technology is designed to ensure that the person using the card is indeed the legitimate cardholder, through the chip's PIN verification feature. However, the technology is not specifically designed to identify fraudulent returns using bank cards, especially fraud such as customers "renting" merchandise for free.

Prior Art Attempts to Counter Return Fraud

Faced with a rapid increase in returns fraud, merchants have had to improve their procedures for detecting and dealing with fraudulent returns while maintaining good customer service. Merchants are increasingly adopting stricter refund and exchange policies. Proof of purchase, in general the sales receipt, is often required. The receipt also indicates the form of payment so that an appropriate refund can be made (credit to payment card or bank account, restoration of value to gift card, refund of cash.) Many merchants establish a time period within which a return will be accepted, especially concerning products with a short life cycle such as fashion or seasonal items. The merchant's return policy will usually indicate whether and under what conditions the merchant will provide a full monetary refund, a store gift card or credit note, or a product exchange. In an effort to discourage fraud, increasing numbers of merchants offer to mail a cheque to the customer. Most merchants will also indicate whether the name, address, phone number and a form of photo identification may be required to complete the transaction.

A known method of using technology to address returns fraud and abuse in a consistent and automated manner is to create a central database and associated service to authorize return transactions. These methods use a combination of rules and predictive statistical modelling to identify potentially fraudulent or abusive returns before the returns are accepted. A unique customer ID, such as a driver's license number or passport number, is entered into a credit card POS terminal along with information concerning the returned merchandise. The POS terminal sends the information to the central host and waits for a message indicating approval or rejection of the transaction.

This method has drawbacks. The procedures described above are intended to prevent the estimated 2% of returns transactions which are fraudulent or abusive, but risk penalizing the estimated 98% of customers that return merchandise in good faith. Some customers object to the potential loss of privacy, especially if the central service is able to compare the customer's returns activity across multiple merchant categories. Some countries are in the process of implementing strong privacy laws which could make the operation of such a database more complicated for merchants. Furthermore, such solutions are expensive to operate, and merchants must eventually pass the expense on to their customers, either by charging a specific fee to customers returning merchandise, or by bundling the costs into their general overhead, which in essence passes the expense on to all customers.

As indicated, returns fraud costs US merchants alone US$ 16 billion annually, much greater than the US$ 3 billion loss due to bank card fraud. Therefore there exists a clear need for a quicker, less obtrusive system for identifying return fraud which can be implemented using existing infrastructure. In particular there is a need for a system that takes advantage of existing infrastructure based on chip card technology, which was designed to counter bank card fraud.

SUMMARY OF THE INVENTION

The present invention provides a method for authorising return of a purchase from a merchant by a customer wherein the authorisation process occurs between a customer chip card and the merchant POS terminal.

In particular, the present invention provides a method for authorising return of a purchase by a customer to a merchant by an interaction of a customer chip card upon which a customer transaction history is stored and a merchant POS terminal upon which predetermined data is stored, the method comprising the steps of,
(a) reading at least part of the customer transaction history from the customer chip card,
(b) comparing the part of the customer transaction history read from the customer chip card with the predetermined data, and
(c) issuing to the merchant a message from the POS terminal based upon the outcome of the comparison.

Preferably, the predetermined data includes merchant return policy rules that define the merchant's return policy, for example the allowed return period, the maximum number of returns allowed by the retailer within a given period. Typically the merchant's card processor enters the return policy parameters into the merchant's POS payment terminal by downloading them from the card processor's central system, in the same way that traditional credit card related merchant parameters are entered into the terminal. For example, typical merchant return policy parameters stored in the POS include the following:

Maximum allowed return date: xx days after purchase
Maximum number of total returns allowed within return period: xx
Maximum value of total returns allowed within return period: xx
Return period: month/quarter/semester/year Typically the customer return history data stored on the card's microprocessor chip would include information such as:

Merchant Identifier
Date of last approved return
Cumulative Monetary Amount of all returns approved for this merchant
Cumulative Number of all returns approved for this merchant Typically this data is stored for each merchant outlet at which the cardholder has performed a return transaction.

In particular, the present invention provides a method for authorising return of a purchase by a customer to a merchant comprising the steps of,
(a) registering the merchant return policy rules at a POS terminal,
(b) storing a customer transaction history on a customer chip card,
(c) reading at least part of the customer transaction history from the customer chip card,
(d) comparing the part of the customer transaction history read from the customer chip card with the merchant return policy rules, and
(e) issuing to the merchant a message based on the outcome of the comparison,
wherein steps (d) and (e) are carried out at a POS terminal.

The present invention may additionally include,
(d1) analysing the part of the customer transaction history that has been read from the customer chip card to identify a trace of the original purchase.

In this case the POS terminal issues to the merchant a message, such as a suggested response based on both the comparison with the merchant return policy rules and the analysis of the customer transaction history.

Typically the customer simply presents the product to be returned to the merchant along with the cash register receipt and customer chip card. The merchant inserts the card in the POS terminal and enters the date of the purchase and the amount to be refunded. The message issued by the POS terminal will typically either affirm or decline authorisation, the message being either 'accept' or 'reject'. Alternatively the response may be issued in terms of different levels of risk associated with authorisation, for example, using a scale of 1 to 10 where 1 is low risk and 10 is high risk.

Obviously, it is possible to have a combination of these two options. Likewise an explanation of why the request was rejected may be given in the message. For example if the rejection is because the item could only be returned within 30 days after purchase, but 3 months have gone by, then indicate that the return period is too late, and include the number of days late. If the rejection is because the maximum number of returns within the past 6 months have been reached, then indicate that x returns were already performed over the past 6 months. If the return is rejected for multiple reasons, this could be indicated as well, listing out each reason. In this way the merchant can make a more informed decision whether or not to override the system. This additional information will also give the merchant more to use during the commercial discussion explaining to the customer why the return cannot be accepted.

Accordingly, the present invention may additionally include the steps of,
(f) in the event that the message rejects authorisation return of the purchase, nevertheless entering an authorisation for the return of the purchase in the POS terminal; and
(g) updating the customer transaction history on a customer chip card with this authorisation.

If the return request is accepted, or the degree of risk is acceptably low the refund amount is automatically processed through the payment system of the bank associated with the chip card.

The present invention thus leverages chip card technology to automatically identify potentially fraudulent or abusive returns, without the effort and overhead costs of operating a central database and authorization service. The authorisation process occurs automatically between the customer chip card and the merchant POS terminal. This solution benefits customers, as the procedures would be less obtrusive than existing methods requiring the customer to present picture ID such as a driver's license or a passport.

Typically, when a customer returns merchandise, the customer presents their original purchase receipt along with the chip card which is to be credited for the returned merchandise. The clerk inserts the card in the POS terminal and enters information such as the date of the original purchase and the amount to be refunded. The POS terminal checks that the date does not exceed the maximum allowed return period defined by the merchant and then looks into the card's microprocessor chip for prior return history performed by the customer at this merchant. A return processing algorithm executed within the POS terminal then determines whether or not the customer's cumulative return history respects the merchant's return policy.

If the merchant return policy rules are still complied with after adding the current requested refund to the customer return history, then the POS will send a message to the merchant indicating that the return should be approved and a refund provided. The refund may then be automatically applied to the customer's chip card account through the standard payment network. The chip card customer return history data is updated with the newly authorized return.

One of the advantages of the present invention is its novel approach to managing the risk by verifying that a trace of the original purchase is present on the chip card and, for example, that the requested refund amount was less than or equal to the original purchase value. No further verification of purchased items is required, and no integration with the merchant's POS scanning equipment would be needed. Furthermore, by simply ensuring that each card abide strictly with the merchant's return policies concerning the maximum number and/or value of returns allowed in a given period, a large portion of returns fraud and abuse can be eliminated without even verifying that the same card was used for both the original purchase as well as the return.

Preferably, the present invention can specifically process refund transactions differently from payment transactions, so as to identify the number and/or cumulative value of refunds individually at each merchant's store or chain. Bank card technology of the prior art is designed to allow a pre-defined number of transactions, and/or cumulative transaction value, to be performed off-line before an authorization is requested, regardless of where the transactions are made and with no distinction as to the number or value of transactions occurring at individual merchant stores or chains. Preferably the present invention is operated in respect of 'new generation' smart cards produced by companies like Gemplus, Axalto and Oberthur. Smart cards produced by these companies rely on specifications developed by Visa and MasterCard, such as card and terminal interface specifications known as "EMV" (for Europay MasterCard Visa, the three organizations which jointly developed the basic smart payment card specifications) and data access specifications such as "MODS" (for MasterCard Open Data Storage) and "VS3" (for Visa Smart Secure Storage). The invention also relies on 'new generation' POS terminals produced by companies like Ingenico, Hypercom and Verifone.

To further reduce the risk of fraud, the merchant may insist, or have a rule that the card used for the refund was also the same card used for the original purchase. This can be enabled by storing within the card's microprocessor chip a list of the most recent purchases made with the card at that merchant's store or chain. Typically the card maintains a record of all the transactions that occurred within the merchant's pre-defined maximum allowable return period. For example, if the merchant's policy is to only refund merchandise purchased within the last 30 days, then the chip must contain all transactions at this merchant's store or chain within the last 30 days. When a customer returns merchandise, the clerk inserts the chip card in the POS terminal and enters the date of the original purchase and the amount to be refunded. The POS terminal checks that the card contains a record of the original purchase matching the date entered by the clerk, and checks that the amount of the requested refund is less than or equal to the total amount of the original purchase. Smart chip cards already store the most recent transactions performed with the card, but the list concerns all uses of the card across all merchants. When the list becomes full, the oldest transactions disappear. With the existing method, a particular transaction performed within a merchant's maximum allowable return period could disappear, making it impossible to check that the refund corresponds to a valid purchase. Typically the present invention addresses this technical problem by storing each merchant's most recent transactions separately from transactions relating to other merchants. One might think that the memory requirements within the card will become very large, but in fact this is offset by the fact that the maximum allowable return period will generally be relatively short.

Some merchants may want to ensure that the refund is for exactly the same item which was purchased using the same card used for the refund. In other words, some merchants will want to verify that the cardholder did indeed purchase the returned item. This is possible by storing more transaction information within the chip, for each item purchased. For example the chip could include each item's UPC or EAN code, the quantity purchased and the price paid for the item. This information could be sent to the payment terminal from the merchant's scanning system, in the same way that current scanning systems are able to send the total transaction amount to the payment terminal in order to eliminate the need for the clerk to manually enter the total when processing a chip card. Typically, when a customer returns merchandise, the clerk inserts the chip card in the POS terminal and enters the date of the original purchase and the UPC or EAN code of the returned item. The POS terminal can check that the card contains a record of the original item purchased, matching the date and product code entered by the clerk. The POS terminal can also check that the item has not already been returned, by virtue of an additional code in the chip indicating whether or not each item has been returned, and the quantity of each item returned. This level of verification obviously requires additional memory in the card but in fact this is offset by the fact that the maximum allowable return period will generally be relatively short.

In particular the present invention provides a system for authorising return of a purchase by a customer to a merchant by interaction of a customer chip card upon which a customer transaction history is stored and a merchant POS terminal upon which predetermined data is stored, the method comprising:

(a) a merchant POS terminal,
(b) a customer chip card,
wherein in response to a customer purchase return request the POS terminal,
  (i) reads at least part of the customer transaction history from the customer chip,
  (ii) compares the part of the customer transaction history read from the customer chip card with predetermined data stored by the POS terminal, and
  (iii) issues to the merchant a message based on the outcome of the comparison.

In particular the present invention provides a system for authorising return of a purchase by a customer to a merchant the method comprising:
(a) a merchant POS terminal,
(b) a customer chip card,
wherein in response to a customer purchase return request the POS terminal,
  (i) reads at least part of the customer transaction history from the customer chip card,
  (ii) analyses the part of the customer transaction history that has been read to identify a trace of the original purchase,
  (iii) compares the trace of the original purchase against merchant predetermined data stored by the POS terminal, and
  (iv) issues to the merchant a suggested response to the request based on the outcome of the analysis and comparison.

The system may further include a server with which the chip card can exchange information, such as for example, downloading merchant return policy parameters.

In a further embodiment the present invention provides a method for authorising return of a purchase by a customer to a merchant comprising:
(a) communicating predetermined merchant data to a POS terminal,
(b) communicating a purchase return request from a customer to a merchant,
(c) communicating at least part of a customer transaction history from a customer chip card to the POS terminal, and
(d) communicating the results of analysis of the customer transaction history to the merchant, the analysis being based on the transaction history read from the customer chip card and the merchant data stored in the POS terminal.

In a further embodiment the present invention provides a method for authorising return of a purchase by a customer to a merchant comprising:
(a) communicating merchant return policy rules to a POS terminal,
(b) communicating a purchase return request from a customer to a merchant,
(c) communicating at least part of a customer transaction history from a customer chip card to the POS terminal, and
(d) communicating the results of analysis of the customer transaction history to the merchant, the analysis being based on the transaction history read from the customer chip card and a merchant return policy rules stored in the POS terminal.

EXAMPLES

The present invention will be further described with reference to the following example relating to various attempts by customers to return purchases to a merchant.

In each example, a customer returns merchandise along with their original purchase receipt and the chip card which is to be credited for the returned merchandise. A clerk employed by the merchant inserts the card in the merchant POS terminal and enters information including the date of the original purchase and the amount to be refunded. The POS terminal checks that the date does not exceed the maximum allowed return period defined by the merchant and then looks into the card's microprocessor chip for prior return history of the customer with respect to this merchant.

In each case, the merchant POS terminal includes the following Merchant Returns Parameters:
  Return Period=1 month
  Minimum number of days between 2 returns: 5 days
  Maximum number of days allowed for a return: 90
  Maximum number of accepted returns allowed per Return Period=2
  Maximum cumulative amount of accepted returns allowed per Return Period=$250

A return processing algorithm executed within the POS terminal then determines whether or not the customer's cumulative return history complies with the rules of the merchant return policy.

If comparison of the return history with the merchant return policy rules indicates that the rules are still complied with after adding the current refund request to the customer return history, then the POS will flag to the merchant that the return should be approved and therefore a refund should be provided. The refund may then be automatically applied to the customer's card account through the standard payment network. The customer return history data on the chip card is updated with the newly authorized return.

Each example as described below includes:
  Context, that is, the relevant parts of the customer transaction history recorded on the customer chip card and read by the POS terminal,
  Return Details, that is, details pertaining to the purchase return requested by the customer, and
  Result, that is, whether or not the POS terminal recommends the return request be accepted or refused, based on the Context, Return details and Merchant Return Parameters.

Example 1

Return Accepted

Context:
  Last return Date: 12 Oct. 2005
  Number of accepted returns: 1/Cumulative value of accepted returns: $159
Return Details:
  Original Purchase Date: 20 Jul. 2005
  Return Amount: $56
  Return date: 20 Oct. 2005
Result: Return Accepted
  Last return more than 5 days ago
  Purchase done less than 90 days ago
  $2^{nd}$ return in October month
  New cumulative amount for October month=$215 (less than $250)

In this example, the POS terminal returned a recommendation that the refund be paid based on the compliance of the return details with the rules of the merchant return policy.

Example 2

Too Many Returns and Too Late

Context:
  Last return Date: 12 Oct. 2005
  Number of accepted returns: 2/Cumulative value of accepted returns: $159
Return Details:
  Original Purchase Date: 10 Jul. 2005
  Return Amount: $10
  Return date: 19 Oct. 2005
Result: Rejected
  2 returns max. allowed per month
  Return after allowed return period
  In this example, the POS terminal recommended that the refund be refused because the number of purchase returns would exceed the number allowed per month by the merchant return policy. Also the refund would be refused because the purchase return date exceeds the maximum number of days allowed for the return.

Example 3

Too Many Returns and Too Late

Context:
  Last return Date: 12 Oct. 2005
  Number of accepted returns: 1/Cumulative value of accepted returns: $159
Return Details:
  Original Purchase Date: 10 Jul. 2005
  Return Amount: $100
  Return date: 19 Oct. 2005
Result:
  Return rejected: $250 max. allowed per month
  Return after allowed return period
  In this example, the POS terminal recommended that the refund be refused because the value of the purchases returned within the return period would exceed the amount allowed by the merchant return policy. Also the refund would be refused because the purchase return date exceeds the maximum number of days allowed for the return.

Example 4

Too Frequent Returns and Too Late

Context:
  Last return Date: 12 Oct. 2005
  Number of accepted returns: 1/Cumulative value of accepted returns: $159
Return Details:
  Original Purchase Date: 10 Jul. 2005
  Return Amount: $56
  Return date: 19 Oct. 2005
Result:
  Return rejected: last return done less than 5 days ago
  In this example, the POS terminal recommended that the refund be refused because the frequency of returns would exceed the frequency allowed according to the merchant return policy. Also the refund would be refused because the purchase return date exceeds the maximum number of days allowed for the return.

Example 5

Returned Too Late

Context:
  Last return Date: 12 Oct. 2005
  Number of accepted returns: 1/Cumulative value of accepted returns: $159
Return details:
  Original Purchase Date: 2 Feb. 2005
  Return Amount: $56
  Return date: 16 Oct. 2005
Result:
  Return rejected: purchase done more than 90 days ago
  In this example, the POS terminal suggests that the refund be refused because the amount of time elapsed between the purchase and the return exceeded the time allowed by the merchant return policy rules.

Example 6

Return Accepted

Context:
  Last return Date: 12 Oct. 2005
  Number of accepted returns: 2/Cumulative value of accepted returns: $159
Return Details:
  Original Purchase Date: 3 Aug. 2005
  Return Amount: $150
  Return date: 3 Nov. 2005
Result: accepted
  Current month>Last Return Month: all counters reset
  +the POS terminal returned a recommendation that the refund be paid based on the compliance of the return details with the rules of the merchant return
  In this example, the Cumulative value of accepted returns (159$) added to Value of the current return ($150) exceeds the Maximum Cumulative value of accepted returns ($250). However, as the current return is done in a different period (month) than the Last Return, the Card Cumulative Counters are reset, which implies that the Cumulative value of accepted returns (0$ due to reset) added to Value of the current return ($150) do not exceed the Maximum Cumulative value of accepted returns ($250).

DRAWINGS

The present invention will be further described with reference to the following non-limiting drawings and description.

Figure 1:
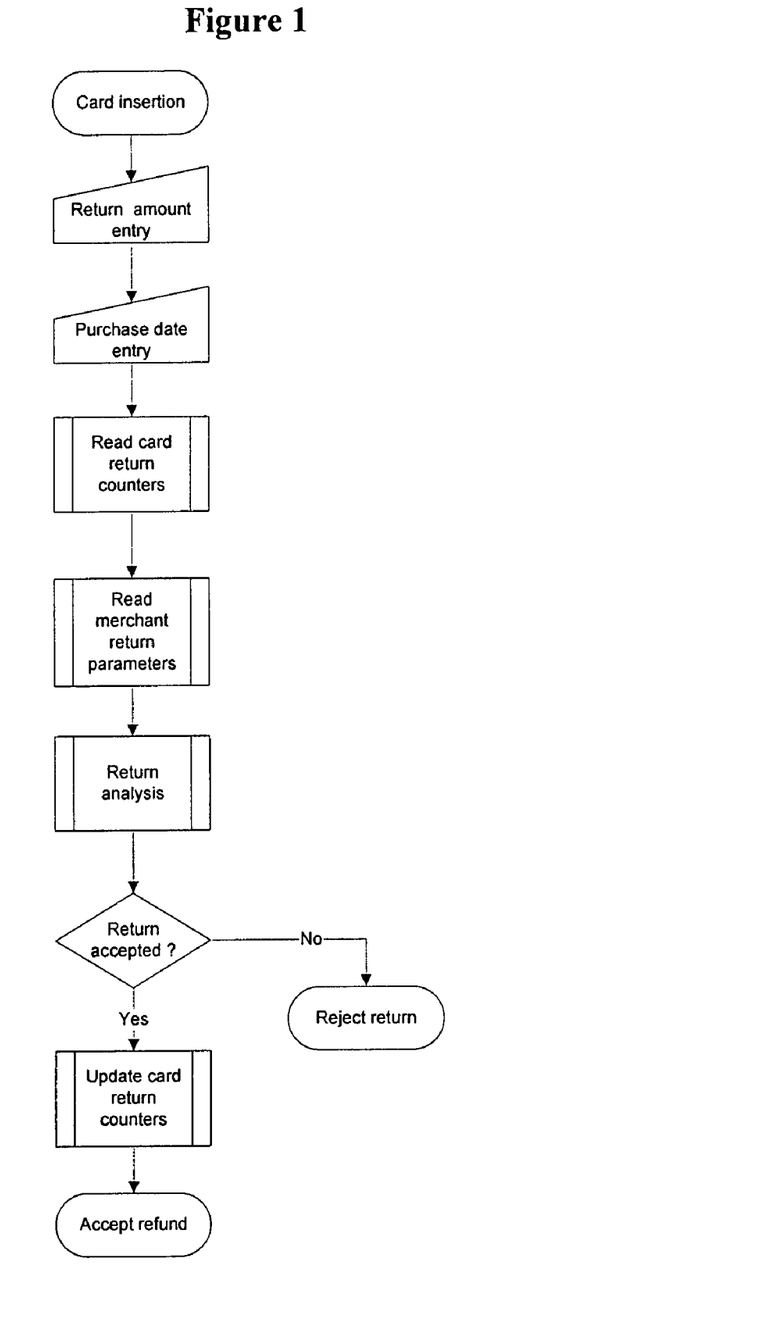
FIG. 1 is a flow chart describing the overall return process according to one embodiment of the overall method of the invention

With reference to FIG. 1, the clerk inserts the card in the POS, then enters the Refund Amount Entry and the Purchase Date Entry. The POS then reads the Card Return History for this specific merchant, and analyses it according to the Merchant Return Parameters defined for this type (profile) of card. The POS then decides either to accept or reject the refund. If the refund is accepted, the POS adds the Return Transaction Details to the Card Return History.

Figure 2:
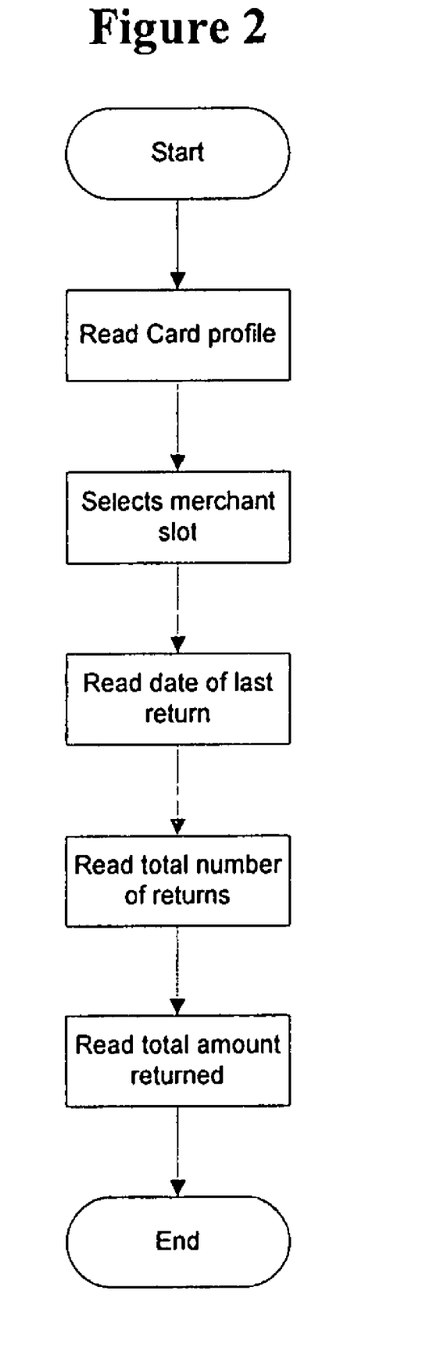
FIG. 2 is a flow chart describing the "Read Card Return Counters" process described in the Global Return Flow

With reference to FIG. 2, the POS reads the Card Profile in the card (a same merchant can apply different return parameters for example for a Basic Card or for a Gold Card).

The POS then selects in the card the relevant data slot containing the Card Return History for this particular merchant or group or merchants.

The POS particularly extracts the following information from the card:
  Date of last accepted return for this merchant
  Total number of accepted returns for this merchant
  Total Value of all accepted returns for this merchant With reference to FIG. 3, the POS selects the Merchant Return Parameters matching the type of card inserted (identified by Card Profile information).

Figure 3:
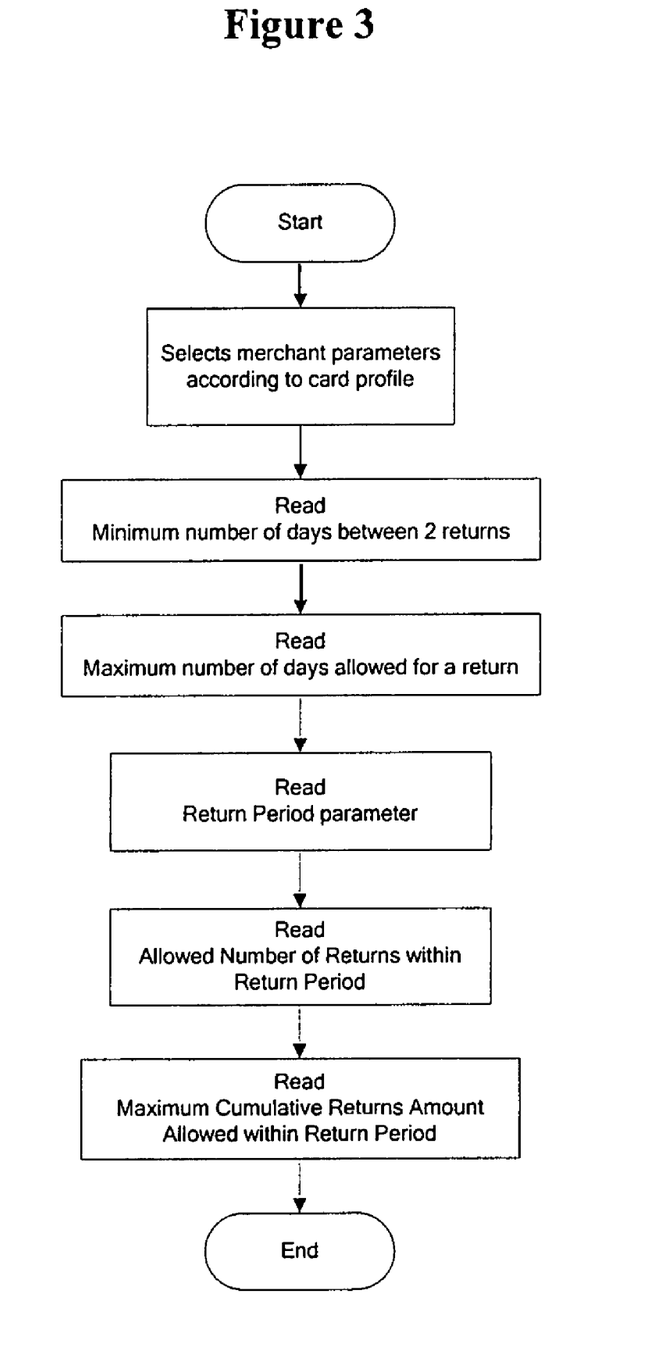
FIG. 3 is a flow chart describing the "Read Merchant Return Parameters" process of the Global Return Flow depicted in FIG. 2

The system particularly extracts the following parameters:
  Minimum number of days between 2 consecutive returns
  Maximum number of days allowed for a return
  Return Period duration: month/quarter/semester/year
  Allowed number of returns during one Return Period
  Maximum value of returns allowed during one Return Period With reference to FIG. 4, the POS first checks the date of the Last Return done with this card according to the Merchant Return Parameter defining the minimum number of days between 2 returns. If the rule is not respected, the refund is rejected.

Figure 4:
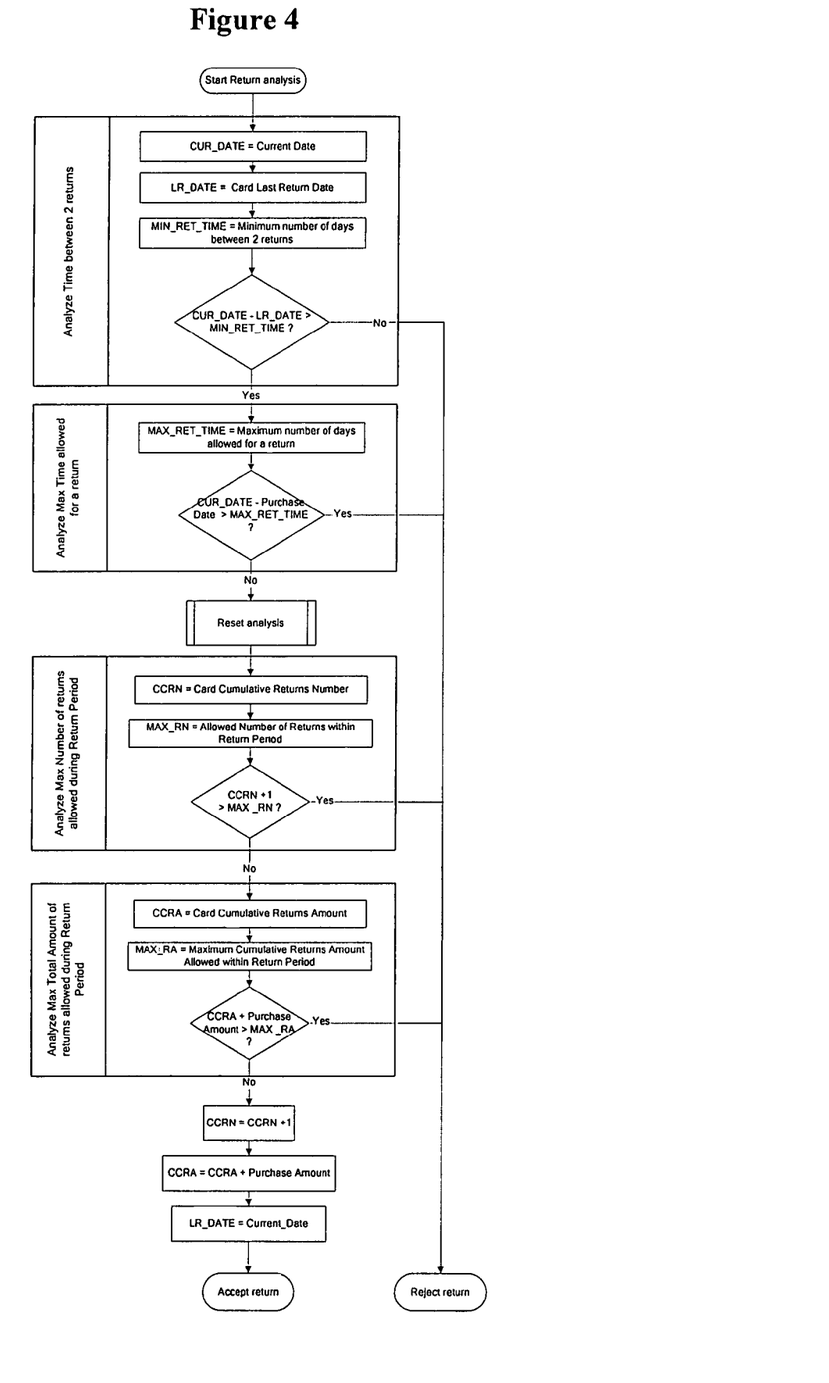
FIG. 4 is a flow chart describing the "Return Analysis" process of the Global Return Flow depicted in FIG. 2

The POS then checks the date of the original purchase according to the Merchant Return Parameter defining the maximum number of days allowed for doing a return.

If the rule is not respected, the refund is rejected.

The POS then performs a Reset Analysis, in order to eventually Reset the Card Return Counters if the current return is done in a different Return Period than the last accepted return. If the date of the last return is in the same period than the current date (either same month, quarter, semester or year), Card Return Counters are left unchanged. If not, they are reset.

The POS then checks the Card Return Counter defining the total number of returns done with this card, according to the Merchant Return Parameter defining the Maximum number of returns allowed for this merchant for one Return Period. If the rule is not respected, the refund is rejected.

The POS then checks the Card Return Counter defining the total value of returns done with this card, according to the Merchant Return Parameter defining the Maximum value of returns allowed for this merchant for one Return Period. If the rule is not respected, the refund is rejected.

Finally, if all rules checked above did not lead to a rejected return, the POS then increments by one the Card Return Counters defining the Total Number of Returns, increases the Card Return Counters defining the Total Value of Returns with the value of the actual return, and then replaces the Card Last Return information with the date of the actual return, and then informs other processes that the Refund is accepted.

Figure 5:
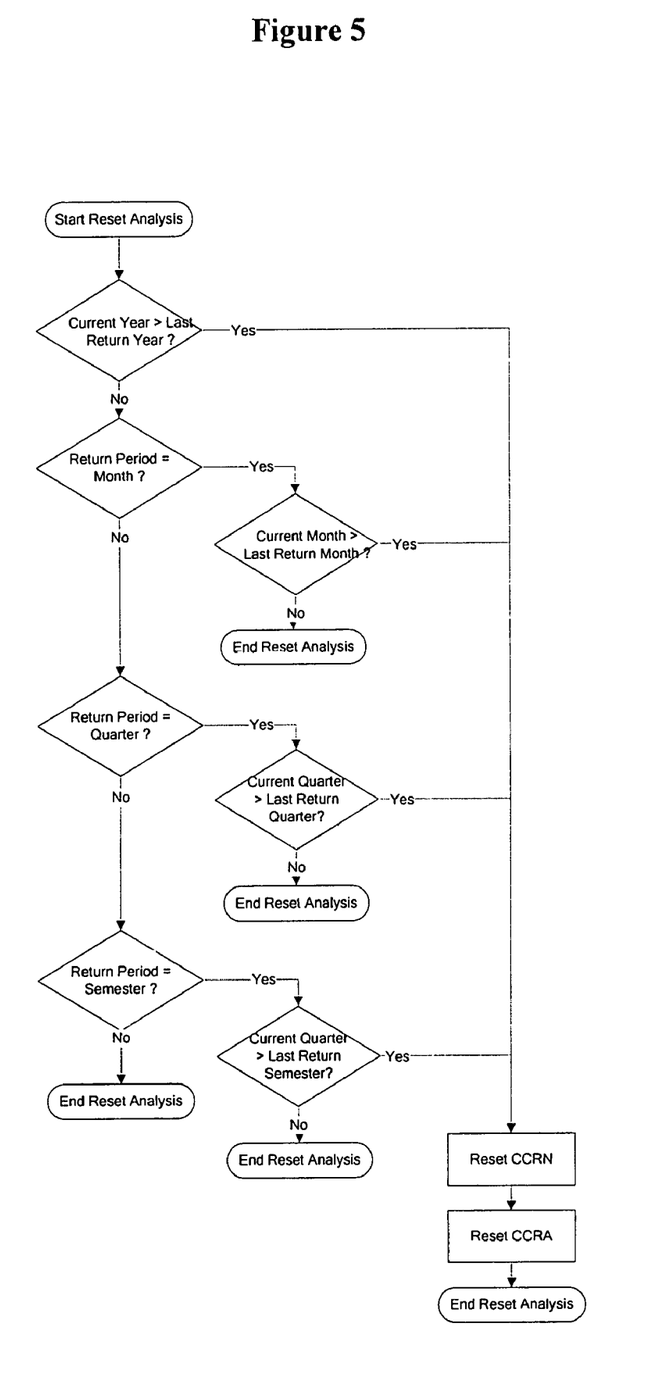
FIG. 5 is a describing the "Reset analysis" process of the "Return Analysis" process depicted in FIG. 4

With reference to FIG. 5, the POS checks the date of the Last Return done with this card for this specific merchant or group of merchants.

If the Merchant Return Period parameter equals "month", the POS then compares the month of the Last Return date with the month of the actual return date. If they do not match, this means that the Card Counters have to be reset.

The same logic is applied if the Merchant Return parameter equals "Quarter", "Semester" or "Year", the Card Counters being reset if the period (month, quarter, semester, year) of the Last Return is not the same than the period of the actual return date.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The claims defining the invention are as follows:

1. A method for authorising return of a purchase by a customer to a merchant by an interaction of a customer chip card upon which a customer transaction history is stored and a merchant point of sale (POS) terminal upon which predetermined data is stored, the method comprising the steps of,
   (a) reading, by the POS terminal, at least a portion of the customer transaction history from the customer chip card, the portion of the customer transaction history comprising customer return history data,
   (b) comparing the portion of the customer transaction history read from the customer chip card with the predetermined data, and
   (c) issuing to the merchant a message from the POS terminal based upon an outcome of the comparison.

2. A method according to claim 1 wherein the predetermined data comprises merchant return policy rules.

3. A method according to claim 2 wherein a card processor enters the return policy rules into the POS terminal by download from a central system associated with the card processor.

4. A method according to claim 1 wherein the customer transaction history is stored on a microprocessor chip of the customer chip card.

5. A method according to claim 4 wherein customer transaction history is stored for each merchant outlet at which the customer has performed a transaction.

6. A method for authorising return of a purchase by a customer to a merchant comprising the steps of,
   (a) registering merchant return policy rules at a point of sale (POS) terminal,
   (b) storing a customer transaction history on a customer chip card, the customer transaction history comprising customer return history data,
   (c) reading, by the POS terminal, at least part of the customer transaction history from the customer chip card,
   (d) comparing, by the POS terminal, the part of the customer transaction history read from the customer chip card with the merchant return policy rules, and
   (e) issuing to the merchant a message from the POS terminal based on an outcome of the comparison.

7. A method according to claim 6 which further includes,
   (d1) analyzing the part of the customer transaction history that has been read from the customer chip card to identify a trace of the original purchase.

8. A method according to claim 6 which further includes,
   (f) entering an authorisation for the return of the purchase in the POS terminal overriding a message rejecting authorisation of the return of the purchase; and
   (g) updating the customer transaction history on a customer chip with this authorisation.

9. A method according to claim 6 which further includes,
(f) automatically processing the refund amount through the payment system of a bank associated with the chip card in response to acceptance of the return request.

10. A method according to claim 6 wherein a card processor enters the return policy rules into the POS terminal by download from a central system associated with the card processor.

11. A method according to claim 6 wherein the customer transaction history is stored on a microprocessor chip of the customer chip card.

12. A method according to claim 11 wherein the customer transaction history is stored for each merchant outlet at which the customer has performed a transaction.

13. A system for authorising return of a purchase by a customer to a merchant by interaction of a customer chip card upon which a customer transaction history is stored and a merchant point of sale (POS) terminal upon which predetermined data is stored, the system comprising:
(a) a merchant POS terminal,
(b) a customer chip card,
wherein in response to a customer purchase return request the POS terminal is configured to:
  (i) read at least a portion of the customer transaction history from the customer chip card, the portion of the customer transaction history comprising customer return history data,
  (ii) compare the portion of the customer transaction history read from the customer chip card with predetermined data stored by the POS terminal, and
  (iii) issue to the merchant a message based on an outcome of the comparison.

14. A system for authorising return of a purchase by a customer to a merchant the system comprising:
(a) a merchant point of sale (POS) terminal,
(b) a customer chip card,
wherein in response to a customer purchase return request, the POS terminal is configured to:
  (i) read at least part of the customer transaction history from the customer chip card, the customer transaction history comprising customer return history data,
  (ii) analyse the part of the customer transaction history that has been read to identify a trace of the original purchase,
  (iii) compare the trace of the original purchase against merchant predetermined data stored by the POS terminal, and
  (iv) issue to the merchant a suggested response to the request based on an outcome of the analysis and comparison.

15. A method for authorising return of a purchase by a customer to a merchant comprising:
(a) communicating predetermined merchant data to a point of sale (POS) terminal,
(b) communicating a purchase return request from a customer to a merchant,
(c) communicating at least a portion of a customer transaction history from a customer chip card to the POS terminal, including reading from the customer chip card by the POS terminal, wherein the portion of the customer transaction history comprises customer return history data, and
(d) communicating results of analysis of the customer transaction history to the merchant, the analysis being based on the portion of the customer transaction history read from the customer chip card and the merchant data stored in the POS terminal.

16. A method for authorising return of a purchase by a customer to a merchant comprising:
(a) communicating merchant return policy rules to a point of sale (POS) terminal,
(b) communicating a purchase return request from a customer to a merchant,
(c) communicating at least part of a customer transaction history from a customer chip card to the POS terminal, including reading from the customer chip card by the POS terminal, wherein the part of the customer transaction history comprises customer return history data, and
(d) communicating results of analysis of the customer transaction history to the merchant, the analysis being based on the customer return history data and merchant return policy rules stored in the POS terminal.

* * * * *

UNITED STATES PATENT AND TRADEMARK OFFICE
CERTIFICATE OF CORRECTION

PATENT NO. : 8,046,260 B2
APPLICATION NO. : 11/665325
DATED : October 25, 2011
INVENTOR(S) : Aneace Haddad et al.

It is certified that error appears in the above-identified patent and that said Letters Patent is hereby corrected as shown below:

On the Title Page, Item (60); under Related US Application Data:
        Please insert --Provisional Application No. 60/741,553 filed on December 2, 2005--

Signed and Sealed this
Twenty-ninth Day of May, 2012

David J. Kappos
*Director of the United States Patent and Trademark Office*